(12) United States Patent
Treudt (10) Patent No.: US 9,803,530 B2
(45) Date of Patent: Oct. 31, 2017

(54) LIQUID RESERVOIR, IN PARTICULAR FOR AN AQUEOUS UREA SOLUTION

(75) Inventor: Volker Treudt, Windeck (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 13/885,086

(22) PCT Filed: Oct. 18, 2011

(86) PCT No.: PCT/EP2011/005213
§ 371 (c)(1),
(2), (4) Date: May 13, 2013

(87) PCT Pub. No.: WO2012/062400
PCT Pub. Date: May 18, 2012

(65) Prior Publication Data
US 2013/0233850 A1  Sep. 12, 2013

(30) Foreign Application Priority Data
Nov. 12, 2010  (DE) .................. 10 2010 051 072

(51) Int. Cl.
*F01N 3/20* (2006.01)
*F02M 37/22* (2006.01)
*F02M 37/10* (2006.01)

(52) U.S. Cl.
CPC ........... *F01N 3/208* (2013.01); *F01N 3/2013* (2013.01); *F01N 3/2066* (2013.01); *F02M 37/22* (2013.01);
(Continued)

(58) Field of Classification Search
None
See application file for complete search history.

(56) References Cited

U.S. PATENT DOCUMENTS 4,546,750 A   10/1985  Brunell et al.
5,951,050 A    9/1999  Siekmann
(Continued)

FOREIGN PATENT DOCUMENTS

CN    101828012 A    9/2010
DE    19619992 A1   11/1997
(Continued)

OTHER PUBLICATIONS

PCT International Search Report and Written Opinion mailed Feb. 29, 2012, received in corresponding PCT Application No. PCT/EP11/05213, 13 pages.
(Continued)

*Primary Examiner* — Robert James Popovics
(74) *Attorney, Agent, or Firm* — Grossman Tucker Perreault & Pfleger, PLLC (57) ABSTRACT

The invention relates to a liquid reservoir (1), in particular for an aqueous urea solution, comprising a buffer storage means (2) arranged on the bottom of the liquid reservoir (1) in the installation position, a liquid delivery unit (3), at least one, preferably a plurality of first filter elements (4) arranged on the bottom in the installation position outside the buffer storage means (2), each of which first filter elements is connected to the liquid delivery unit (3) via a liquid line (5), the first filter elements (4) being constructed such that the filter fabric of the first filter elements (4) is permeable to the liquid located in the liquid reservoir (1) and impermeable to air, a second filter element (6) being arranged between the interior of the buffer storage means (2) and the liquid delivery unit (3), which second filter element is constructed such that the filter fabric of the second filter element (6) is permeable to the liquid located in the liquid reservoir (1) and impermeable to air, the breakthrough pressure of the second filter element (6), at which air is delivered through the filter
(Continued)

element, being greater than the breakthrough pressure of the first filter elements (4), furthermore comprising a first valve (7) between the liquid delivery unit (3) and the first filter elements (4), the opening pressure of the first valve (7) being smaller than the breakthrough pressure of the second filter element (6).

22 Claims, 3 Drawing Sheets

(52) U.S. Cl.
CPC ...... *F01N 2550/05* (2013.01); *F01N 2610/02* (2013.01); *F01N 2610/1406* (2013.01); *F01N 2610/1426* (2013.01); *F01N 2610/1433* (2013.01); *F01N 2610/1466* (2013.01); *F01N 2610/1493* (2013.01); *F02M 37/106* (2013.01); *Y02T 10/24* (2013.01)

(56) References Cited

U.S. PATENT DOCUMENTS

| | | |
|---|---|---|
| 8,680,437 B2 | 3/2014 | Starck |
| 2010/0224282 A1 | 9/2010 | Pozgainer et al. |
| 2010/0224284 A1 | 9/2010 | Kolberg et al. |
| 2011/0209789 A1 | 9/2011 | Murabayashi et al. |
| 2012/0047880 A1* | 3/2012 | Leonard et al. ............... 60/295 |
| 2013/0233850 A1* | 9/2013 | Treudt ........................ 220/4.14 |

FOREIGN PATENT DOCUMENTS

| | | |
|---|---|---|
| DE | 19644464 A1 | 4/1998 |
| EP | 798457 A1 | 10/1997 |
| EP | 1510392 A2 | 3/2005 |
| JP | S60169727 A | 9/1985 |
| JP | S6278523 A | 4/1987 |
| JP | S6283224 A | 4/1987 |
| JP | S6284990 U | 5/1987 |
| JP | S63193926 A | 8/1988 |
| JP | S63306271 A | 12/1988 |
| JP | 2010236435 A | 10/2010 |
| JP | 2010248944 A | 11/2010 |
| JP | 2011026980 A | 2/2011 |
| WO | WO 2010119116 A2 * | 10/2010 ............... F01N 3/20 |

OTHER PUBLICATIONS

"ISO 14617-9:2002-2302, Gas pump (including vacuum pump), compressor, fan", retrieved from http://www.iso.org/pbp/ui#iso:grs:14617:9:1:9.4.1.2:2302 on Apr. 4, 2016, 1 pg.

"File:Vacuum Pump or Compressor.svg", retriefed from https://commons.wikimedia.org/wiki/File:Vacuum_Pump_or_Compressor.svg on Apr. 4, 2016, 3 pgs.

* cited by examiner

LIQUID RESERVOIR, IN PARTICULAR FOR AN AQUEOUS UREA SOLUTION

The invention relates to liquid reservoirs, in particular for an aqueous urea solution.

In vehicle engineering, increasing use is being made of the SCR (Selective Catalytic Reduction) method to reduce nitrogen oxide emissions from diesel vehicles. The ammonia required for the SCR reaction is not used directly, but instead in the form of a 32.5% aqueous urea solution to DIN 700 70. This aqueous urea solution is injected by the SCR catalytic converter in the exhaust gas line, for example by means of a metering pump or an injector. The urea-water solution undergoes a hydrolysis reaction to yield ammonia and $CO_2$. The resultant ammonia is capable of reacting with the nitrogen oxides in the exhaust gas and thus reducing nitrogen oxide emissions. The quantity of urea injected depends on the nitrogen oxide emissions from the engine and thus on the engine's instantaneous rotational speed and torque. The efficiency of the SCR catalytic converter here depends on the aqueous urea solution being injected in the correct ratio to the engine's nitrogen oxide emissions. If too little aqueous urea solution is injected, the efficiency with which nitrogen oxides are reduced declines. If too much urea is injected, the ammonia formed therefrom may not react with nitrogen oxides and pass into the environment. Maximally accurate delivery, preferably in the milliliter range, of aqueous urea solution from the liquid reservoir for the aqueous urea solution to the SCR catalytic converter is therefore necessary.

EP 1 510 392 A2 discloses a fuel tank for a motor vehicle with a fuel delivery unit for delivering fuel. The fuel delivery unit comprises a filter element arranged on the bottom of the fuel tank, the filter element comprising a pouch-shaped filter fabric having a predetermined mesh size. The pouch-shaped filter fabric is arranged in a plurality of low-lying areas of the bottom in the intended installation position of the fuel tank, the mesh size being dimensioned such that the wetted filter fabric is permeable to fuels and impermeable to air. According to a preferred embodiment according to EP 1 510 392 A2, the filter fabric extends substantially over the entire area of the bottom of the fuel tank. In an alternative embodiment, a plurality of individual filter fabrics are arranged distributed in the intended areas of the bottom of the fuel tank. However, at the start of delivery, air is present in the filter fabric extending over the entire area of the bottom of the fuel tank and the liquid lines to the fuel pump, which air must first be removed before fuel is delivered. In the case of a plurality of filter fabrics, which are arranged distributed over the bottom of the fuel tank, the problem arises that air must be uniformly removed from all the liquid lines in order subsequently to ensure uniform delivery of fuel.

Document DE 196 19 992 A1 discloses a fuel delivery module with a fuel pump, a coarse and a fine fuel filter, in which the fuel pump with the upstream coarse fuel filter is surrounded by a fuel pump reservoir arranged on the bottom of a fuel tank. The wall of the fuel pump reservoir is of double-walled construction at least in places. The fine fuel filter is arranged in the completely enclosed interspace of the wall. The interspace here, on the one hand, has an inflow port connected to the fuel pump pressure port in the fine filter inlet zone and, on the other hand, it comprises an outflow port in the fine filter outlet zone.

The object of the invention is accordingly to improve the delivery of a liquid from a liquid reservoir to a downstream consumer, for example an SCR catalytic converter, with regard to the accuracy of the delivered quantity of liquid.

The object is achieved by a liquid reservoir, in particular for an aqueous urea solution, comprising a buffer storage means arranged on the bottom of the liquid reservoir in the installation position, a liquid delivery unit, at least one, preferably a plurality of, first filter elements arranged on the bottom in the installation position outside the buffer storage means, each of which first filter elements is connected to the liquid delivery unit via a liquid line, the first filter elements being constructed such that the filter fabric of the first filter elements is permeable to the liquid located in the liquid reservoir and impermeable to air, a second filter element being arranged between the interior of the buffer storage means and the liquid delivery unit, which second filter element is constructed such that the filter fabric of the second filter element is permeable to the liquid located in the liquid reservoir and impermeable to air, the breakthrough pressure of the second filter element, at which air is delivered through the filter element, being greater than the breakthrough pressure of the first filter elements, furthermore comprising a first valve between the liquid delivery unit and the first filter elements, the opening pressure of the first valve being smaller than the breakthrough pressure of the second filter element.

For the purposes of the invention, the opening pressure of a valve is the pressure at which the valve changes over from the closed state to the open state.

For the purposes of the invention, the breakthrough pressure of a filter element is the pressure at which air is delivered through the filter element.

The opening pressure of the first valve may be influenced by the breakthrough pressure of the first filter elements, as these are series-connected in the direction of flow. The opening pressure of the first valve being smaller than the breakthrough pressure of the second filter element should be taken to mean that the series connection of first filter element and first valve overall exhibits an opening pressure which is smaller than the breakthrough pressure of the second filter element.

The first valve ensures that the liquid is firstly delivered from the buffer storage means via the liquid delivery unit to the consumer. If the buffer storage means is completely emptied, the second filter element within the buffer storage means will block until its breakthrough pressure, before air is aspirated via the second filter element. Before the breakthrough pressure of the second filter element is reached, the first valve opens and liquid is subsequently delivered via the first filter elements, the location of the first filter elements on the bottom of the liquid reservoir ensuring virtually complete emptying of residues from the liquid reservoir. The liquid reservoir according to the invention has the advantage that liquid is firstly drawn from the buffer storage means, meaning the liquid lines are very short.

The liquid delivery unit is preferably arranged within the buffer storage means.

According to one variant of the invention, the second filter element comprises at least two filter fabrics arranged one behind the other in the conveying direction, whereby the breakthrough pressure of the second filter element is increased. The breakthrough pressure of the second filter element may be adjusted in a simple manner by means of the number of filter fabrics arranged one behind the other within the second filter element. Since the breakthrough pressure is dependent on the mesh size of the filter fabric of the second filter element and filter fabrics may only be produced with a mesh size in a specific predetermined range, one option for increasing the breakthrough pressure is to arrange filter elements in a cascade.

According to one preferred variant of the invention, the at least two filter fabrics of the second filter element correspond to the filter fabric of the first filter element. In this manner, just one kind of filter fabric is used within the liquid reservoir according to the invention, whereby manufacturing costs may be reduced, since the filter fabric may be manufactured or purchased in larger numbers.

According to a further variant of the invention, the first filter elements are in each case connected to a collection point via a liquid line and the collection point is connected to the liquid delivery unit via a liquid collection line. The liquid collection line reduces the air within the line system between the first filter elements and the liquid delivery unit, whereby the delivery accuracy of liquid from the liquid reservoir according to the invention to a downstream consumer is increased markedly.

According to a preferred variant of the invention, the collection point is, in the installation position, the highest point in the liquid connection between the first filter elements and the liquid delivery unit. The combination of collection point and the arrangement of the collection point at what is, in the installation position, the highest point in the liquid connection between the first filter elements and the liquid delivery unit ensure that, as soon as liquid is delivered from a first filter element via the liquid delivery unit, no pressure drop arises in the liquid lines between the collection point and the other first filter elements, as a result of which the corresponding line between the first filter element and collection point could be refilled with air. The liquid delivery unit is conveniently arranged in the installation position below the collection point.

According to a convenient variant of the invention, the first valve is arranged in the liquid collection line. A separate first valve thus need not be provided for each first filter element, but instead one single first valve for all the first filter elements.

According to a further variant of the invention, the buffer storage means comprises a heating element in order to melt or heat the liquid present in the buffer storage means. In addition or alternatively, the buffer storage means may take the form of a swirl pot. The heating element ensures that sufficient liquid is available for delivery at any point in time. In particular in the case of an aqueous urea solution, the heating element is advantageous since the freezing point of aqueous urea solution is approx. −11° C. and thus within the service range of motor vehicles. The swirl pot offers the advantage that sloshing of liquid within the liquid reservoir is at least partially suppressed, so ensuring that the liquid delivery device is better supplied with liquid.

In a further variant, the liquid reservoir according to the invention furthermore comprises a second liquid reservoir arranged outside the liquid reservoir having at least one third filter element arranged on the bottom in the installation position, the second liquid reservoir being connected to the liquid delivery unit via the at least one third filter element and a liquid connection line. Such a development serves to adapt the liquid reservoir according to the invention to the spatial conditions in which the liquid reservoir is to be installed. For example, spatial conditions are limited in a motor vehicle, since as much as possible of the available space should be made available for the vehicle interior. It may thus be advantageous to make the liquid reservoir of multipart construction and to locate the individual liquid reservoirs at various locations in the motor vehicle. A further advantage of such a development is that the liquid connection line between the first liquid reservoir and the second liquid reservoir does not require a liquid delivery unit, irrespective of the location of the second liquid reservoir. The second liquid reservoir may thus, for example, be arranged in the installation position below or above the first liquid reservoir, without an additional liquid delivery unit being required.

According to a preferred variant of the invention, the liquid reservoir comprises a second valve between the second filter element and the liquid delivery unit and a third valve between the third filter element and the liquid delivery unit, the opening pressure of the second valve being smaller than the opening pressure of the first valve and the opening pressure of the third valve being smaller than the opening pressure of the second valve. Such a development ensures that firstly the liquid is delivered from the second liquid reservoir, then from the buffer storage means of the first liquid reservoir and subsequently the residual liquid located in the first liquid reservoir is delivered via the first filter elements.

According to a particularly preferred variant, the liquid reservoir comprises a fourth valve between the liquid delivery unit and the interior of the liquid reservoir in order to allow liquid to flow back from the liquid delivery unit into the liquid reservoir, preferably into the liquid reservoir which comprises a heating element. According to one convenient variant, the fourth valve is arranged between the liquid delivery unit and the buffer storage means. It is thus ensured, when the line between the liquid delivery unit and consumer is backwashed, that the liquid is returned to the already heated liquid reservoir, so preventing the liquid from refreezing. The fourth valve conveniently takes the form of a one-way valve, for example of a non-return valve, in order to prevent delivery of liquid from the liquid reservoir to the liquid delivery unit.

According to a convenient variant of the invention, the second liquid reservoir comprises a second collection point, the second collection point preferably being, in the installation position, the highest point of the liquid line within the second liquid reservoir.

According to a further variant of the invention, the second filter element is arranged in the installation position at the bottom of the buffer storage means. It is thus ensured that the buffer storage means is virtually completely emptied before liquid is delivered via the first filter elements.

The object is furthermore achieved by a liquid reservoir, in particular for an aqueous urea solution, comprising a liquid delivery unit arranged within the liquid reservoir, at least two first filter elements arranged, in the installation position, on the bottom of the liquid reservoir, the first filter elements in each case being connected to a collection point via a liquid line and the collection point being connected to the liquid delivery unit via a liquid collection line, the collection point being, in the installation position, the highest point in the liquid connection between the first filter elements and the liquid delivery unit.

Such a development ensures that, as soon as liquid is delivered via a first filter element of the liquid delivery unit, the pressure conditions between the other first filter elements and the collection point remain unchanged, in particular it ensures that the liquid level does not drop between the corresponding first filter elements and the collection point. This has the advantage that, as soon as no more liquid can be delivered from the one first filter element, the liquid lines between the other first filter elements and the collection point are at least partially, preferably completely, filled with liquid.

According to one variant of the invention, the liquid reservoir comprises a second liquid reservoir arranged outside the first liquid reservoir with at least one filter element arranged on the bottom in the installation position, the second liquid reservoir being connected to the liquid delivery unit via the at least one third filter element and a liquid connection line. Such a multipart development of the liquid reservoir according to the invention permits better adaptation to the spatial conditions at the installation location, for example within a motor vehicle. A further advantage of such a development is that no liquid delivery unit is required between the first liquid reservoir and the second liquid reservoir, irrespective of the location of the second liquid reservoir. The second liquid reservoir may thus, for example, be arranged in the installation position below or above the first liquid reservoir, without an additional liquid delivery unit being required.

In one particularly preferred variant of the invention, the liquid reservoir comprises a first valve between the first filter elements and the liquid delivery unit and a third valve between the third filter elements and the liquid delivery unit, the opening pressure of the third valve being smaller than the opening pressure of the first valve. It is thus ensured that the liquid is firstly delivered from the second liquid reservoir via the liquid delivery unit, before the liquid is delivered from the liquid reservoir via the first filter elements.

According to one convenient variant of the invention, the liquid connection line comprises a non-return valve in order to prevent liquid from flowing back from the liquid delivery unit into the second liquid reservoir. This is in particular advantageous when liquid is backwashed from the line between the liquid delivery unit and consumer.

According to a further convenient variant of the invention, the second liquid reservoir comprises a second collection point, the second collection point preferably being, in the installation position, the highest point of the liquid line within the second liquid reservoir. The third filter elements within the second liquid reservoir are thus connected to the collection point within the second liquid reservoir via rising lines and the second collection point is connected to the liquid delivery unit via the liquid connection line. The advantages of such a development correspond to those of the collection point within the first liquid reservoir.

In the installation position, the first filter elements and/or the third filter elements are arranged at the lowest points of the liquid reservoir and of the second liquid reservoir respectively. Complete emptying of the liquid reservoir is enabled as a consequence.

In a preferred variant of the invention, the breakthrough pressure of the first filter elements and/or of the third filter elements is of identical magnitude. According to the invention, no selection thus occurs between the individual first filter elements and third filter elements.

The liquid reservoir is conveniently produced by blow moulding or injection moulding methods. This reduces manufacturing costs while simultaneously ensuring a long service life.

According to a further convenient variant of the invention, the first valve, the second valve, the third valve and/or the fourth valve take the form of a one-way valve, for example of a non-return valve.

The invention is explained in greater detail below with reference to some exemplary embodiments shown in the drawings, in which.

Figure 1:
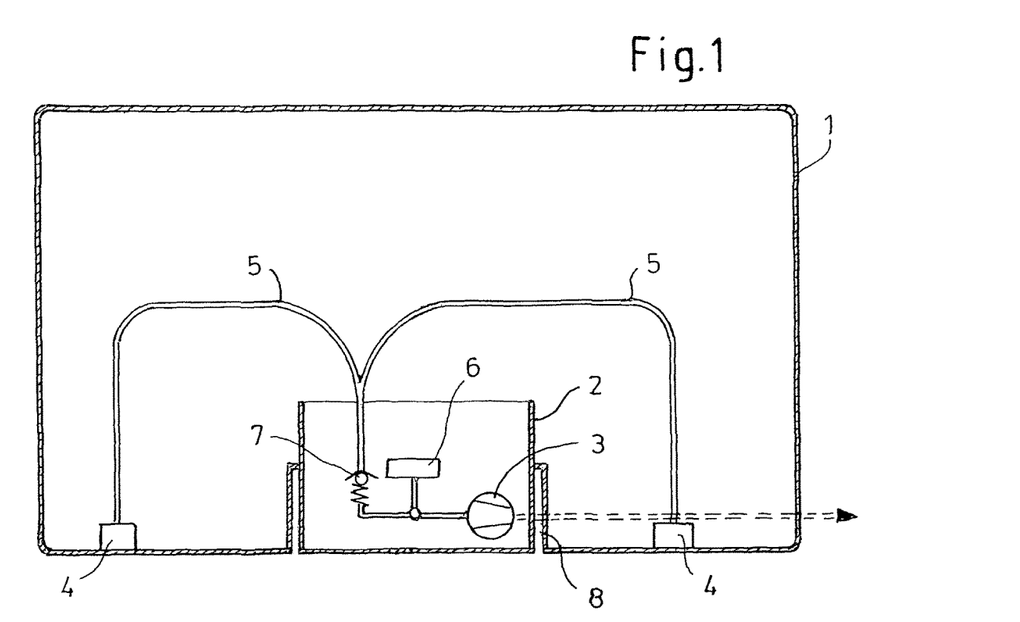
FIG. 1: is a sectional view of a first embodiment according to the invention.

FIG. 1 shows a sectional view of a liquid reservoir 1 according to the invention, in particular for an aqueous urea solution. The liquid reservoir 1 here comprises a buffer storage means 2 arranged on the bottom of the liquid reservoir 1 in the installation position, a liquid delivery unit 3 arranged within the buffer storage means 2, and two first filter elements 4 arranged on the bottom in the installation position outside the buffer storage means 2, each of which first filter elements is connected to the liquid delivery unit 3 via a liquid line 5. The first filter elements 4 are constructed such that the filter fabric of the first filter elements 4 is permeable to the liquid located in the liquid reservoir 1 and impermeable to air. A second filter element 6 is furthermore arranged between the interior of the buffer storage means 2 and the liquid delivery unit 3, which second filter element is constructed such that the filter fabric of the second filter element 6 is permeable to the liquid located in the liquid reservoir and impermeable to air. The breakthrough pressure of the second filter element 6, at which air is delivered through the filter element, is greater than the breakthrough pressure of the first filter elements 4. The liquid reservoir 1 furthermore comprises a first valve 7 between the liquid delivery unit 3 and the first filter elements 4, the opening pressure of the first valve 7 being smaller than the breakthrough pressure of the second filter element 6.

The opening pressure of the first valve 7 may be influenced by the breakthrough pressure of the first filter elements 4, as these are series-connected in the direction of flow. The opening pressure of the first valve 7 being smaller than the breakthrough pressure of the second filter element 6 should be taken to mean that the series connection of first filter element 4 and first valve 7 overall exhibits an opening pressure which is smaller than the breakthrough pressure of the second filter element.

For example, the second filter element 6 exhibits a breakthrough pressure of 100 mbar, the first filter elements 4 a breakthrough pressure of 50 mbar and the first valve an opening pressure of 25 mbar.

A liquid reservoir 1 designed in this manner ensures that the liquid is firstly delivered from the buffer storage means 2 by means of the liquid delivery unit 3. Subsequently, once the buffer storage means 2 no longer contains any liquid, before any breakthrough of the second filter element 6, the first valve 7 opens and the liquid is drawn via the first filter elements 4 and the liquid lines 5 from various points on the bottom of the liquid reservoir 1, until the latter is completely empty.

In order to reach the breakthrough pressure of the second filter element 6, the latter may comprise at least two filter fabrics arranged one behind the other in the conveying direction. These at least two filter fabrics of the second filter element 6 preferably correspond to the filter fabric of the first filter element 4.

The buffer storage means 2 comprises a heating element 8, in order to heat the liquid located in the buffer storage means 2 or to melt it once it has frozen.

The buffer storage means 2 is furthermore constructed as a swirl pot, in order to limit movement of the liquid during movement of the liquid reservoir, for example when being fitted in a motor vehicle, or to ensure that the second filter element remains surrounded by liquid for as long as possible.

The second filter element 6 may furthermore be arranged on the bottom of the buffer storage means in the installation position, in order to ensure maximally complete emptying of residues from the buffer storage means.

The first filter elements 4 are correspondingly arranged, in the installation position, at the lowest points of the liquid reservoir 1.

In the exemplary embodiment shown, the breakthrough pressure of the first filter elements 4 is of identical magnitude so as not to make any selection between the two first filter elements 4.

The liquid reservoir shown in FIG. 1 may be produced for example by blow moulding or injection moulding and serves to transport aqueous urea solution in a motor vehicle, the aqueous urea solution being supplied to an SCR catalytic converter.

Figure 2:
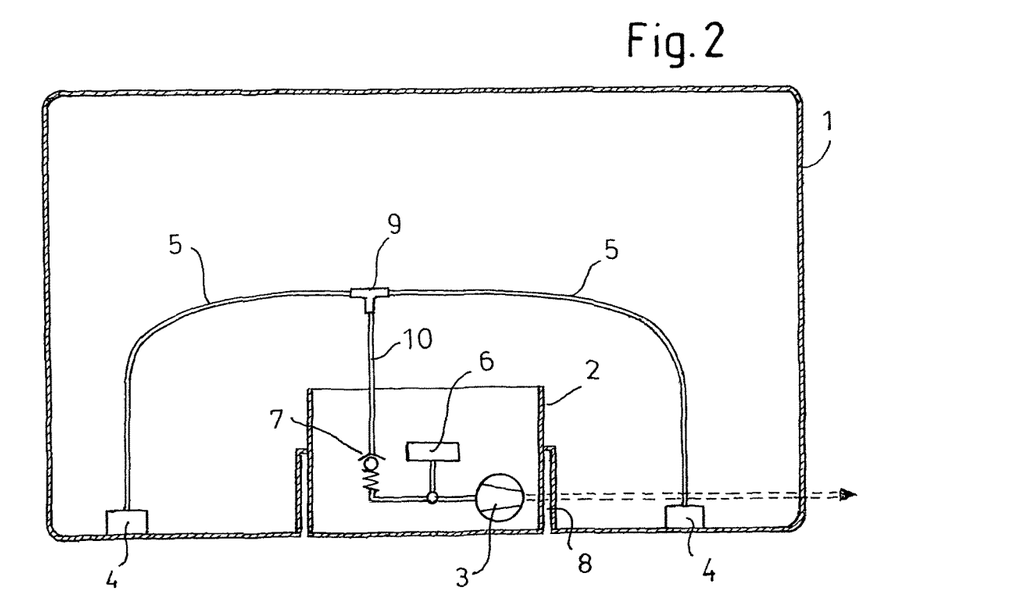
FIG. 2: is a sectional view of a second embodiment according to the invention.

The liquid reservoir 1 for an aqueous urea solution shown in FIG. 2 comprises a buffer storage means 2 arranged on the bottom of the liquid reservoir 1 in the installation position, a liquid delivery unit 3, at least two first filter elements 4 arranged on the bottom in the installation position outside the buffer storage means 2, each of which first filter elements is connected to the liquid delivery unit 3 via a liquid line 5, the first filter elements 4 being constructed such that the filter fabric of the first filter elements 4 is permeable to the liquid located in the liquid reservoir 1 and impermeable to air. Between the interior of the buffer storage means 2 and the liquid delivery unit 3 there is arranged a second filter element 6 which is constructed such that the filter fabric of the second filter element 6 is permeable to the liquid located in the liquid reservoir and impermeable to air, the breakthrough pressure of the second filter element 6, at which air is delivered through the filter element, being greater than the breakthrough pressure of the first filter elements 4. Between the liquid delivery unit 3 and the first filter elements 4 is arranged a first valve 7, the opening pressure of the first valve 7 being smaller than the breakthrough pressure of the second filter element 6.

The first filter elements 4 are each connected to a collection point 9 via a liquid line 5 and the collection point 9 is connected to the liquid delivery unit 3 via a liquid collection line 10. In the installation position, the collection point 10 is arranged at the highest point in the liquid connection between the first filter elements 4 and liquid delivery unit 3. Such an arrangement has the advantage that, as soon as liquid is delivered through a first filter element 4 and the associated liquid line 5, the liquid level in the other liquid lines 5 does not fall, such that liquid may subsequently be delivered more quickly through these liquid lines 5.

As may furthermore be seen from FIG. 2, the first valve 7 is arranged in the liquid collection line 10.

Figure 3:
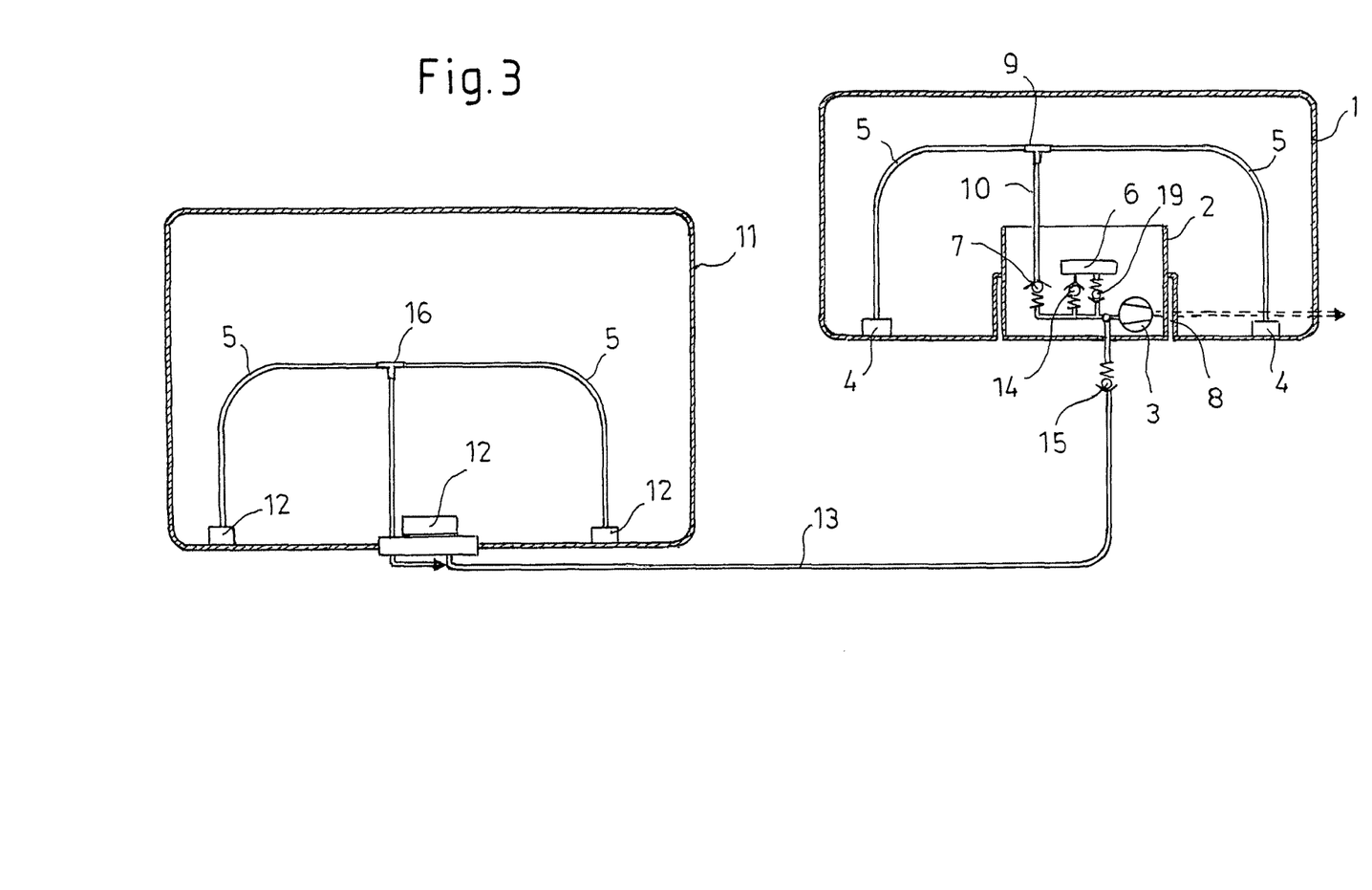
FIG. 3: is a sectional view of a third embodiment according to the invention.

FIG. 3 shows a liquid reservoir 1 according to FIG. 2 which furthermore comprises a second liquid reservoir arranged outside the liquid reservoir 1 having at least one third filter element 12 arranged on the bottom in the installation position, the second liquid reservoir 11 being connected to the liquid delivery unit 3 via the at least one third filter element 12 and a liquid connection line 13.

The liquid reservoir 1 is here also denoted the active reservoir, as it comprises active components such as for example the liquid delivery unit 3 and the second liquid reservoir 11 is denoted the passive reservoir, as it contains no active components.

A two-part development of the liquid reservoirs 1, 11 has a number of advantages. On the one hand, the containers may be of smaller construction and thus better adapted to the space present at the installation location. On the other hand, it is sufficient for one of the two reservoirs to comprise a heating device 8 in order to provide sufficient liquid even at relatively low temperatures. The liquid in a smaller liquid reservoir 1, 11 may here be thawed more quickly than in a large container.

The liquid reservoir 1 connected to the second liquid reservoir 11 from FIG. 3 furthermore comprises a second valve 14 between the second filter element 6 and the liquid delivery unit 3 and a third valve 15 between the third filter element 12 and the liquid delivery unit 3, the opening pressure of the second valve 14 being smaller than the opening pressure of the first valve 7 and the opening pressure of the third valve 15 being smaller than the opening pressure of the second valve 14. Such a development ensures that it is primarily the liquid from the second liquid reservoir which is consumed until the latter is empty or frozen. Then, the liquid from the buffer storage means is consumed until the latter is likewise empty and finally the residual liquid from the liquid reservoir 1 is consumed via the first filter elements 4 and the liquid connection 5.

The embodiment shown in FIG. 3 has the advantage over the known prior art that no additional liquid delivery unit is required between the active reservoir and passive reservoir.

In a preferred variant, the liquid reservoir 11 comprises a fourth valve 19 between the liquid delivery unit 3 and the interior of the buffer storage means 2, in order to allow liquid to flow back from the liquid delivery unit 3 into the buffer storage means 2, for example during backwashing of the liquid line between the liquid delivery unit 3 and the consumer. The fourth valve 19 takes the form of a one-way valve embodied as a non-return valve. This has the advantage that the liquid in the buffer storage means 2 heated by means of the heating element 8 is backwashed, so preventing or delaying refreezing of the liquid. The fourth valve 19 may be constructed in one piece with the second valve 14. The line between the liquid delivery unit 3 and the consumer is backwashed after the consumer is switched off in order to empty it of liquid and avoid freezing of the liquid within the line to the consumer.

Like the liquid reservoir 1 shown in FIG. 3, the second liquid reservoir 11 may likewise comprise a plurality of third filter elements 12 which are connected to a second collection point 16 via liquid lines 5, the second collection point 16 being connected to the liquid delivery unit 3 via the liquid connection line 13, as indicated by the dashed lines in FIG. 3.

Figure 4:
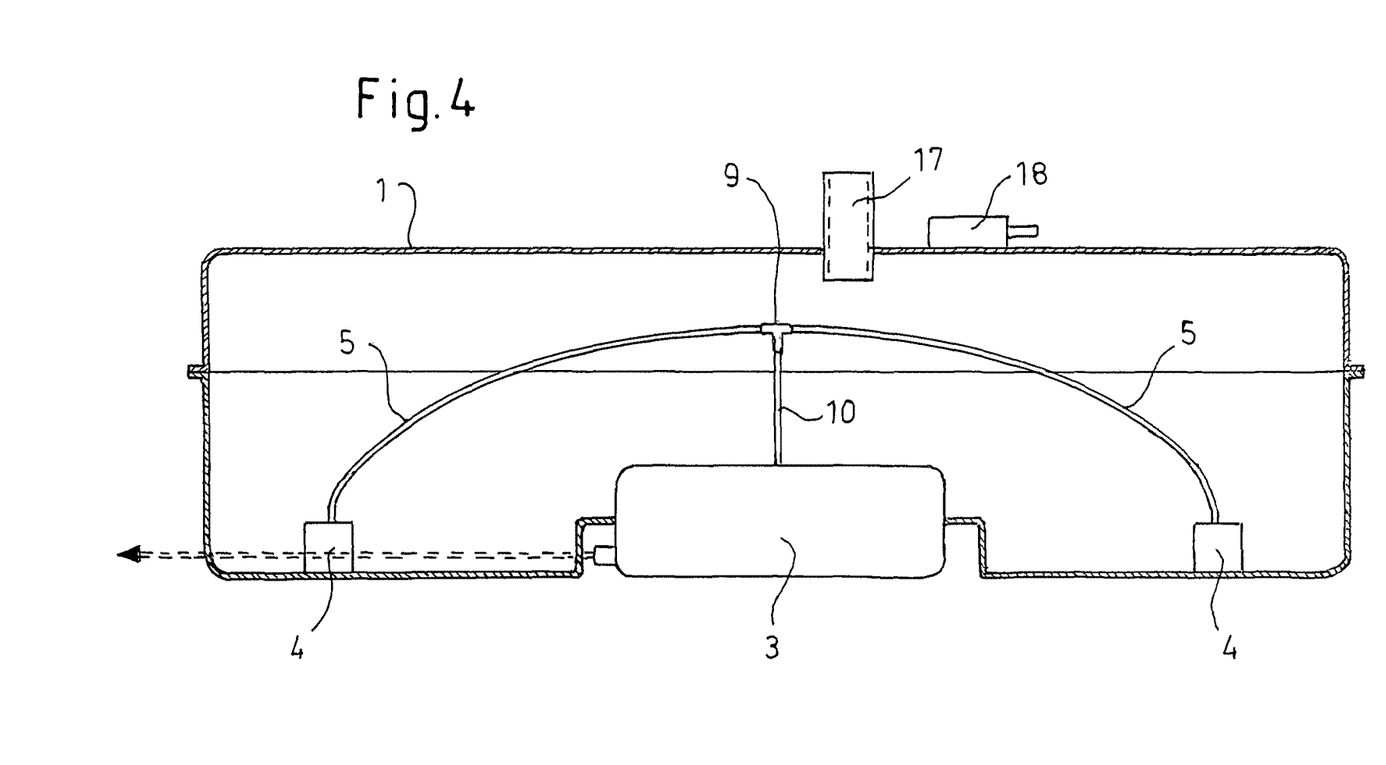
FIG. 4: is a sectional view of a further embodiment according to the invention.

FIG. 4 shows a liquid reservoir 1, in particular for an aqueous urea solution, comprising a liquid delivery unit 3, four filter elements 4 arranged on the bottom of the liquid reservoir 1 in the installation position, each of which first filter elements 4 being connected to a collection point 9 via a liquid line 5 and the collection point 9 being connected to the liquid delivery unit 3 via a liquid collection line 10. The collection point 9 is, in the installation position, the highest point in the liquid connection between the first filter elements 4 and the liquid delivery unit 3. Such a development has the advantage that, as soon as the liquid delivery unit 3 delivers liquid via a first filter element 4, the associated liquid line 5 and the liquid collection line 10, the liquid level in the other liquid lines 5 to the other first filter elements does not fall due to a pressure drop, but instead remains at a constant level. In the event that liquid may no longer be delivered via the first filter element 4, which first supplied the liquid, the other liquid lines 5 to the other first filter elements 4 are at least partially, preferably completely, filled with liquid and liquid can be supplied to the consumer without delivering relatively large quantities of air.

As shown in FIG. 3, the liquid reservoir 1 from FIG. 4 may furthermore comprise a second liquid reservoir 11 arranged outside the liquid reservoir 1 having at least one third filter element 12 arranged on the bottom in the installation position, the second liquid reservoir 11 being connected to the liquid delivery unit 3 via the at least one third filter element 12 and a liquid connection line 13. In order to effect selection between the liquid reservoir 1 and the second liquid reservoir 11, a first valve 7 is for example provided between the first filter elements 4 and the liquid delivery unit 3 and a third valve 15 between the third filter elements 12 and the liquid delivery unit 3, the opening pressure of the third valve 15 being smaller than the opening pressure of the first valve 7.

A fourth valve 19 is arranged between the liquid delivery unit 3 and the interior of the buffer storage means 2, such that the liquid backwashed out of the line between the liquid delivery unit 3 and consumer passes into the heated buffer storage means 2. The fourth valve 19 may also be arranged such that backwashing of the liquid proceeds via the second filter element 6.

In order to ensure complete emptying of residues from the liquid reservoir 1, the buffer storage means 2 and/or the second liquid reservoir 11, the first filter elements 4, the second filter elements 6 and the third filter elements 12 are respectively arranged on the bottom of the particular reservoir.

Depending on the field of application, a liquid reservoir 1 according to the invention may comprise a refilling port 17 and/or a ventilation element 18, as shown in FIG. 4.

The first valves 7, second valves 14 and third valves used in the exemplary embodiments according to FIGS. 1 to 4 all take the form of a one-way valve, for example embodied as a non-return valve.

LIST OF REFERENCE SIGNS

1 Liquid reservoir
2 Buffer storage means
3 Liquid delivery unit
4 First filter element
5 Liquid line
6 Second filter element
7 First valve
8 Heating element
9 Collection point
10 Liquid collection line
11 Second liquid reservoir
12 Third filter element
13 Liquid connection line
14 Second valve
15 Third valve
16 Second collection point
17 Refilling port
18 Ventilation element
19 Fourth valve

What is claimed is:

1. Liquid reservoir for a liquid formed of aqueous urea solution, comprising:
   a first reservoir,
   a buffer storage means arranged on a bottom of the first reservoir,
   a liquid delivery unit,
   at least one first filter element arranged on the bottom of the first reservoir outside the buffer storage means, the first filter element connected to the liquid delivery unit via a liquid line,
   the first filter element being constructed such that a filter fabric of the first filter element is permeable to the liquid and impermeable to air,
   a second filter element being arranged between an interior of the buffer storage means and the liquid delivery unit, which second filter element is constructed such that a filter fabric of the second filter element is permeable to the liquid and impermeable to air,
   a breakthrough pressure of the second filter element, at which air is delivered through the second filter element, being greater than a breakthrough pressure of the first filter element,
   furthermore comprising a first valve between the liquid delivery unit and the first filter element, the opening pressure of the first valve being smaller than the breakthrough pressure of the second filter element.

2. Liquid reservoir according to claim 1, the second filter element comprising at least two filter fabrics arranged one behind the other in a conveying direction, whereby the breakthrough pressure of the second filter element is increased.

3. Liquid reservoir according to claim 2, the at least two filter fabrics of the second filter element having at least one of a same breakthrough pressure and material construction as the filter fabric of the first filter element.

4. Liquid reservoir according to claim 1, the first filter element being connected to a first collection point via a liquid line and the first collection point being connected to the liquid delivery unit via a liquid collection line.

5. Liquid reservoir according to claim 4, the first collection point being a highest point in a liquid connection between the first filter element and the liquid delivery unit.

6. Liquid reservoir according to claim 4, the first valve being arranged in the liquid collection line.

7. Liquid reservoir according to claim 1, the buffer storage means comprising a heating element in order to melt or heat the liquid when located in the buffer storage means.

8. Liquid reservoir according to claim 1, furthermore comprising a second reservoir arranged outside the first reservoir, the second reservoir having at least one third filter element arranged on a bottom of the second reservoir, the second reservoir being connected to the liquid delivery unit via the at least one third filter element and a liquid connection line.

9. Liquid reservoir according to claim 8, furthermore comprising a second valve between the second filter element and the liquid delivery unit and a third valve between the third filter element and the liquid delivery unit, an opening pressure of the second valve being smaller than an opening pressure of the first valve and an opening pressure of the third valve being smaller than the opening pressure of the second valve.

10. Liquid reservoir according to claim 9, furthermore comprising a fourth valve between the liquid delivery unit and the interior of the buffer storage means.

11. Liquid reservoir according to claim 8, furthermore comprising a second collection point in the second reservoir.

12. Liquid reservoir according to claim 8, the second reservoir being arranged above or below the first reservoir.

13. Liquid reservoir according to claim 1, the second filter element being arranged on a bottom of the buffer storage means.

14. Liquid reservoir according to claim 1, the liquid reservoir being produced by blow moulding or injection moulding.

15. Liquid reservoir for a liquid formed of aqueous urea solution, comprising:
    a first reservoir,
    a liquid delivery unit,
    at least two first filter elements arranged on a bottom of the first reservoir,
    each of the first filter elements being connected to a first collection point via a liquid line and the first collection point being connected to the liquid delivery unit via a liquid collection line,
    characterized in that the first collection point is a highest point in a liquid connection between the first filter elements and the liquid delivery unit, and
    characterized in that the liquid delivery unit is arranged below the collection point.

16. Liquid reservoir according to claim 15, furthermore comprising a second liquid reservoir arranged outside the first liquid reservoir, the second reservoir having at least one third filter element arranged on a bottom of the second reservoir, the second reservoir being connected to the liquid delivery unit via the at least one third filter element and a liquid connection line.

17. Liquid reservoir according to claim 16, furthermore comprising at least one of a first valve between the first filter elements and the liquid delivery unit, and a second valve between a second filter element and the liquid delivery unit, and
    a third valve between the third filter element and the liquid delivery unit, the opening pressure of the third valve being smaller than the opening pressure of the first valve.

18. Liquid reservoir according to claim 16, furthermore comprising a fourth valve between the liquid delivery unit and the interior of the buffer storage means.

19. Liquid reservoir according to claim 16, furthermore comprising a second collection point in the second reservoir.

20. Liquid reservoir according to claim 16, the second reservoir being arranged above or below the first reservoir.

21. Liquid reservoir according to claim 16, the second reservoir has a plurality of third filter elements, and
    at least one of the first filter elements and the third filter elements are arranged at a lowest point of the first reservoir and of the second reservoir, respectively.

22. Liquid reservoir according to claim 16, the second reservoir has a plurality of third filter elements, and
    at least one of a breakthrough pressure of the first filter elements and the third filter elements are of identical magnitude.

* * * * *